United States Patent [19]

Hijikata et al.

[11] Patent Number: 5,102,434
[45] Date of Patent: Apr. 7, 1992

[54] METHOD OF INSPECTING A HONEYCOMB STRUCTURAL BODY FOR PURIFYING EXHAUST GASES AND APPARATUS USED IN THE METHOD

[75] Inventors: Toshihiko Hijikata; Satoru Yamada; Ryouzi Horie, all of Nagoya, Japan

[73] Assignee: NGK Insulators, Ltd., Japan

[21] Appl. No.: 657,846

[22] Filed: Feb. 20, 1991

[30] Foreign Application Priority Data

Mar. 6, 1990 [JP] Japan .................................. 2-54309

[51] Int. Cl.⁵ .............................................. B01D 46/00
[52] U.S. Cl. .......................................... 55/97; 55/270; 55/523; 73/38; 73/40
[58] Field of Search ............... 55/97, 270, 523; 73/40, 73/38

[56] References Cited

U.S. PATENT DOCUMENTS

| | | | |
|---|---|---|---|
| Re. 31,952 | 7/1985 | Wilcox et al. ........................... | 55/97 |
| 2,638,688 | 5/1953 | Hazelton ................................. | 73/38 |
| 3,903,727 | 9/1975 | Sweet ...................................... | 55/97 |
| 4,155,247 | 5/1979 | Kaczmarek et al. ................... | 55/270 |
| 4,455,180 | 6/1984 | Hillman et al. ........................ | 55/523 |

FOREIGN PATENT DOCUMENTS 62-53767  11/1987  Japan .

Primary Examiner—Bernard Nozick
Attorney, Agent, or Firm—Parkhurst, Wendel & Rossi

[57] ABSTRACT

A method of inspecting an alternately sealed honeycomb structural body is provided which can quickly, efficiently and accurately inspect presence of defects of the honeycomb structural body. The method comprises, flowing particulates in axial direction of the throughholes from one end surface to the other end surface of the honeycomb structural body, catching the particulates on a gas-permeable screen intimately mounted on the other end surface to form a figure of the particulates, and checking the figure to inspect for defects at internal partition walls and sealing portions of the honeycomb structural body.

6 Claims, 2 Drawing Sheets 5,102,434

METHOD OF INSPECTING A HONEYCOMB STRUCTURAL BODY FOR PURIFYING EXHAUST GASES AND APPARATUS USED IN THE METHOD

BACKGROUND OF THE INVENTION

1. Field of the Invention

The present invention relates to a method of inspecting a honeycomb structural body for purifying exhaust gases, particularly a Diesel particulate filter (abbreviated as DPF, hereinafter) for purifying exhaust gases from Diesel engines, and an apparatus used in the method.

2. Related Art Statement

The aforementioned DPF is composed of a porous ceramic honeycomb structural body having partition walls defining throughholes which are alternately sealed at alternate end surfaces of the honeycomb structural body to force an exhaust gas supplied from one end surface to flow out from the other end surface through the partition walls. Thus, DPF can remove fine particulates in exhaust gases by filtration through the porous partition walls. Therefore, in the production process of DPF, the produced DPF has to be inspected to ensure that no defects at internal partition walls, i.e., cracks which are called "internal cracks" and excessively large pores of diameters larger than those required for the filtration are existent, and that no defects at the sealed portions, i.e., non-sealing or insufficient sealing due to gaps formed between the sealing agent and the partition walls and holes formed in the sealing agent, are not existent.

As a method of inspecting the internal defects of such honeycomb structural body, the method of applicant's Japanese Patent Publication No. 62-53,767 has been known wherein the honeycomb structural body is inspected for internal cracks by irradiation thereof from one end surface with a light to project a projection image on a screen arranged at the other end surface, and checking presence or absence of a disturbance of the light permeating through the internal cracks of the partition walls. However, the inspection method was applied to honeycomb structural bodies not having sealing portions at alternate end surfaces, such as catalyst carriers for purifying exhaust gases, so that it is hardly applicable to DPF having throughholes which are alternately sealed at alternate end surfaces of the honeycomb structural bodies, because the inspection light can not permeate through the sealing portions even if the internal cracks are existent on the partition walls. In regard to the defects at the sealing portions, if such defects are small, the amount of the light permeating through the defects is small, so that the inspection of the defects by means of a screen is difficult. If the defects are not projected on the screen, the throughholes have to be inspected one by one, resulting in problems of inefficient and inaccurate inspection.

SUMMARY OF THE INVENTION

An object of the present invention is to obviate the above drawbacks and problems.

Another object of the present invention is to provide a quick, simple, economical and accurate method of inspecting the defects at partition walls and sealing portions of a honeycomb structural body for purifying exhaust gases having throughholes which are alternately sealed at alternate end surfaces of the honeycomb structural body, such as DPF.

A further object of the present invention is to provide an inspection apparatus used in the present method.

The above objects can now be achieved by the present invention.

The present invention is a method of inspecting a honeycomb structural body for purifying exhaust gases having a number of throughholes which are alternately sealed at alternate end surfaces of the honeycomb structural body, comprising, flowing particulates in axial direction of the throughholes from one end surface to the other end surface of the honeycomb structural body, catching the particulates on a gas-permeable screen intimately mounted on the other end surface to form a figure of the particulates, and checking the figure to inspect defects at internal partition walls and sealing portions of the honeycomb structural body.

The present invention is also an apparatus for inspecting a honeycomb structural body for purifying exhaust gases having a number of throughholes which are alternately sealed at alternate end surfaces of the honeycomb structural body, comprising a supporting member which gastightly supports peripheral portion of one end surface of the honeycomb structural body, a gas generator communicated with the supporting member for producing a particulate-containing gas, a gas-permeable screen arranged on the other end surface of the honeycomb structural body for catching the particulates of the particulate-containing gas, and a gas outlet pipe arranged on the gas-permeable screen for exiting the gas after catching of the particulates.

BRIEF DESCRIPTION OF THE DRAWING

For a better understanding of the present invention, reference is made to the accompanying drawings, in which.

Figure 1:
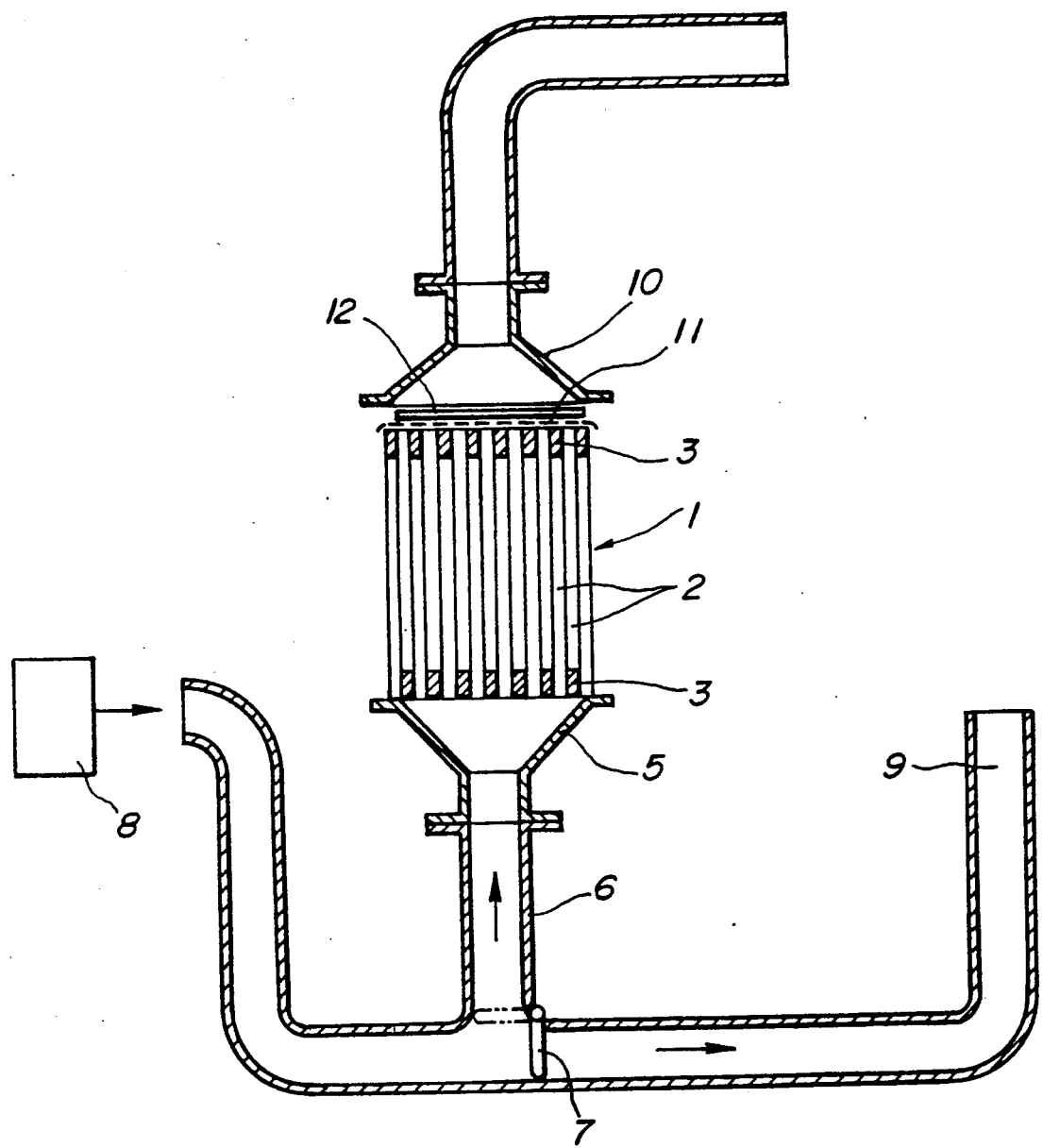
FIG. 1 is a schematic cross-sectional view of an example of the apparatus of the present invention.

Reference Numerals in the Drawings.

1... honeycomb structural body for purifying exhaust gases
2... throughholes
3... sealing agent
5... supporting member
6... gas-feeding pipe
7... switch valve
8... gas generator for producing a particulate-containing gas
9... gas discharge stuck
10... gas outlet pipe
11... screen
12... restraining screen

DESCRIPTION OF THE PREFERRED EMBODIMENTS

Hereinafter, the present invention will be explained in more detail with reference to examples.

EXAMPLE 1

Referring to FIG. 1, a ceramic honeycomb structural body 1 to be inspected for purifying exhaust gases has throughholes 2 which are alternately sealed at alternate end surfaces of the honeycomb structural body 1 by means of a sealing agent 3, as shown in FIG. 1. the mode of sealing the throughhole 1 is not necessarily a checkered pattern and can be varied in various modes. For example, the sealing can be made at alternate rows of the throughholes on alternate end surfaces of the honeycomb structural body 1. Such various modes are included in the present invention defining the throughholes which are expressed as "which are alternately sealed at alternate end surfaces of the honeycomb structural body".

The honeycomb structural body 1 is gastightly supported at a peripheral portion of one end surface thereof by means of a conical supporting table 5. The supporting table 5 is communicated at the lower portion with a gas-feeding pipe 6 which has a switch valve 7 at the lower end. The pipe 6 has two branch pipes at the switch valve 7, one branch pipe being communicated with a gas generator 8 which produces a particulate-containing gas, and the other branch pipe being communicated with a gas discharge stuck 9.

The gas generator 8 in this example is a device for generating a gas containing black soot particulates of a size range of 0.1–1.0 μ, for example. However, in the present invention, particulates other than soot can be used. For example, white particulates, such as wheat flour, can be used. The switch valve 7 is provided for exiting particulates-containing gas produced by the gas generator 8 to the gas exhaust duct 9 at first, and necessary when using a soot gas generator which is unstable at start time of the inspecting operation.

The honeycomb structural body 1 mounted on the supporting table 5 has at its upper end surface an intimately contacted gas outlet pipe 10 via a gas-permeable screen 11. As the material of the screen 11, use is made of any gas-permeable material, such as flexible cloth or filter paper, or rigid material, such as glass or ceramic material If a flexible screen 11 is used, a roughly meshed restraining screen 12 is preferably arranged between the gas outlet pipe 10 and the screen 11 under pressure so that the screen 11 can intimately contact with the honeycomb structural body 1. The color of the screen 11 is preferably white when the particulates are soot, and black when the particulates are white, for facilitating easy visualization of the figure of the particulates adhered on the screen 11.

EXAMPLE 2

In this example, the present inspection method will be explained in more detail with reference to the above exemplified apparatus.

The alternately sealed honeycomb structural body 1 to be inspected for purifying exhaust gases is set on the supporting table 5, the screen 11 is mounted on the upper end surface of the honeycomb structural body 1, and the gas outlet pipe 10 is intimately contacted on the upper end surface of the honeycomb structural body 1 via the screen 11. Then, the switch valve 7 is switched to pass a particulate-containing gas produced by the gas generator 8, such as a soot-containing gas generated by insufficient combustion of a fuel, in the throughholes 2 of the honeycomb structural body 1 in the axial direction thereof from the lower end surface thereof.

Figure 2:
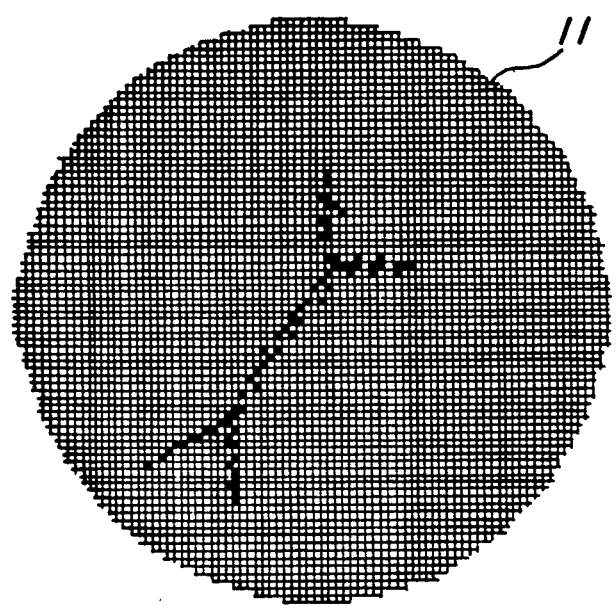
FIG. 2 is a plan view of an example of figure of particulates showing existence of internal defects of a honeycomb structural body.
Figure 3:
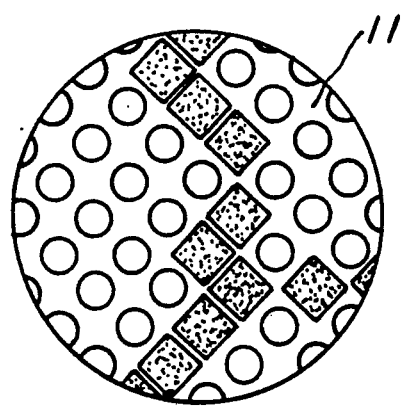
FIG. 3 is a schematic enlarged plan view of a portion thereof.

In this case, the minute soot particles can not pass through the sealing agent 3 at the sealing portions 3 of the throughholes 2, so far as the sealing portions have no defects. Thus, though a portion of the soot particulates is caught on the partition walls of the honeycomb structural body 1, the other portion of the soot particulates is permeated through the partition walls to flow to the upper end surface of the honeycomb structural body 1 and caught on the gas permeable screen 11 to form a figure of soot particulates corresponding to a sealing state of the sealing portions at the upper end surface of the honeycomb structural body 1. Therefore, if the honeycomb structural body 1 is normal or has no defects at the sealing portions and the partition walls, a figure of soot particulates corresponding to the nonsealing portions or open portions of the upper end surface of the honeycomb structural body 1 can be obtained on the screen 11. However, if the honeycomb structural body 1 has internal cracks, etc., on the partition walls, the soot particulates flow through the internal cracks in the neighboring throughholes 2 in large amounts, so that the figure of soot particulates on the screen 11 assumes, for example, a linear pattern or a dotted pattern, as shown in FIGS. 2 and 3, which are different from the figure of normal honeycomb structural body. Similarly, also in case when the alternately sealed honeycomb structural body 1 has defects, etc., at the sealing portions, the figure of soot particulates caught on the screen 11 is clearly different from the figure of normal honeycomb structural body. Therefore, if the screen 11 having a figure of soot particulates caught thereon is removed or taken out from the apparatus so as to be checked by a naked eye, the presence or the absence of the defects of the sealed honeycomb structural body 1 can easily be inspected.

In place of the above exemplified way of checking the figure of soot particulates formed on the screen 11 by a naked eye, various other ways of inspecting the honeycomb structural body 1 can also be used. For example, brightness or darkness of the figure of soot particulates may be automatically measured to emanate a signal which reports the presence of the defects when the brightness or the darkness trespasses a certain level. The above inspection apparatus can be installed on a conveyor transporting a number of sealed honeycomb structural bodies so as to automatically inspect all of the honeycomb structural bodies As explained in detail in the foregoing examples, the present invention passes a flow of particulates through a sealed honeycomb structural body from one end surface thereof to the other end surface, catches the particulates on a screen intimately contacted to the other end surface of the honeycomb structural body to form a figure of the particulates, and checks the figure of the caught particulates to inspect defects of the sealed honeycomb structural body. Therefore, the present invention can quite easily display defects of the sealed honeycomb structural body as compared with the conventional method of directly inspecting the honeycomb structural body by a naked eye. Also, in comparison to the conventional method of using a light, a more accurate inspection can be performed in the present invention.

Therefore, the present invention obviates the drawbacks and problems of prior art, so that it is eminently useful to development of the industry.

Although the present invention has been explained with specific examples, it is of course apparent to those skilled in the art that various changes and modifications thereof are possible without departing from the broad spirit and aspect of the present invention as defined in the appended claims.

What is claimed is:

1. A method of inspecting a honeycomb structural body for purifying exhaust gases having throughholes which are alternately sealed at alternate end surfaces of the honeycomb body, said method comprising:

axially flowing particulates through throughholes of a honeycomb structural body from one end surface thereof to the other end surface thereof, said throughholes being alternately sealed at alternate end surfaces of said honeycomb body from one end surface thereof to the other end surface thereof;

collecting particulates passing through said honeycomb structural body on a gas permeable screen intimately mounted at an end surface of the honeycomb structural body, said particulates forming a figure on the gas permeable screen; and inspecting said figure visually or by automated means for presence of defects at internal partition walls and sealing portions of the honeycomb body.

2. The method of claim 1, wherein said throughholes are alternately sealed in a checkered pattern.

3. The method of claim 1, wherein said throughholes are alternately sealed to form alternately sealed rows of said throughholes.

4. The method of claim 1, wherein said particulates are black soot or wheat flour.

5. An apparatus for inspecting a honeycomb structural body, comprising:

a honeycomb structural body for purifying exhaust gases having a plurality of throughholes which are alternately sealed at alternating end surfaces of said honeycomb structural body;

a first supporting member which gas-tightly supports a peripheral portion of a first end surface of said honeycomb structural body;

a gas generator for production of a particulate-containing gas;

an inlet pipe connecting said gas generator to said supporting member to introduce said particulate-containing gas to said one end surface of said honeycomb structural body;

a second supporting member which gas-tightly supports a peripheral portion of a second end surface of said honeycomb structural body;

a gas permeable screen for collecting particulates passing through said honeycomb structural body mounted between said second supporting member and said peripheral portion of second end surface of said honeycomb structural body;

an outlet pipe connected to said second supporting member; and means for removing said honeycomb structural body and said gas permeable screen from said apparatus.

6. The apparatus of claim 5 further comprising a restraining screen disposed between said gas permeable screen and said outlet pipe.

* * * * *